United States Patent
Chen

[11] Patent Number: 6,145,573
[45] Date of Patent: Nov. 14, 2000

[54] VEHICLE WINDOW SCREEN FOR A SLIDING DOOR OF A VEHICLE

[76] Inventor: Tsen-Shen Chen, No. 46, Lane 228, Chung-Cheng Rd., Wufeng Hsiang, Taichung Hsien, Taiwan

[21] Appl. No.: 09/310,917

[22] Filed: May 13, 1999

[51] Int. Cl.[7] .................................................. E06B 9/00
[52] U.S. Cl. ............................. 160/368.1; 160/370.21; 160/90; 296/152
[58] Field of Search ......................... 160/370.21, 368.1, 160/354, 85, 371, 368.2, 90, 390, 352; 296/152, 97.7, 97.8, 138, 97.9

[56] References Cited

U.S. PATENT DOCUMENTS

| | | | |
|---|---|---|---|
| 1,301,115 | 4/1919 | Finnegan | 160/90 |
| 2,665,754 | 1/1954 | Claussen et al. | 160/370.21 |
| 2,937,700 | 5/1960 | Gibbons | 160/90 |
| 3,085,621 | 4/1963 | Meranto | 160/370.71 |
| 3,749,147 | 7/1973 | Hess et al. | 160/370.21 |
| 4,516,620 | 5/1985 | Mulhern | 160/351 |
| 5,524,964 | 6/1996 | Arapis | 160/370.21 |
| 5,713,624 | 2/1998 | Tower | 160/354 |

*Primary Examiner*—Blair M. Johnson
*Attorney, Agent, or Firm*—Holland & Hart LLP

[57] ABSTRACT

A vehicle window screen includes a net hood having an open lower end and a tightening device connected to the periphery defining the open lower end so as to mount the net hood to a sliding door of a vehicle. The net hood has an inside portion and an outside portion, the inside portion having a slit defined therethrough and an opening defined through the net hood and that communicates with the slit. A roller of the sliding door extends through the opening and a roller shank of the sliding door passes through the slit.

2 Claims, 4 Drawing Sheets

VEHICLE WINDOW SCREEN FOR A SLIDING DOOR OF A VEHICLE

FIELD OF THE INVENTION

The present invention relates to a vehicle window screen, and more particularly, to a screen mountable to the window of a sliding door of a vehicle.

BACKGROUND OF THE INVENTION

A conventional vehicle window screen known to applicant is disclosed in U.S. Pat. No. 5,713,624 to Tower with the title "Restraining Net For Car Window". The retraining net in the '624 patent has a complicated attachment device for securing the net to the window. A lot of time is required to tighten or loosen the retaining net. The operation of the attachment device will reduce drivers' interest in using the retraining net. Nevertheless, neither of the two prior inventions satisfies the need for a door of a van.

The present invention intends to provide a screen mounted to the window of a sliding door of a vehicle and the screen has an opened portion to allow the roller and the roller shank of the sliding door to extend therethrough.

SUMMARY OF THE INVENTION

In accordance with the present invention, a vehicle window screen comprises a net hood having an open lower end and a tightening means connected to the periphery defining the open lower end. The net hood has an inside portion and an outside portion. The inside portion has a slit defined therethrough. An opening is defined through the net hood and communicates with the slit. A roller of the sliding door extends through the opening and a roller shank of the sliding door passes through the slit.

The object of the present invention is to provide a window screen for a sliding door of a vehicle wherein the roller and the roller shank of the sliding door may extend through the opening and the slit.

The benefits and advantages of the present invention will become apparent from the following detailed description with appropriate reference to the accompanying drawings.

DETAILED DESCRIPTION OF THE PREFERRED EMBODIMENTS

Figure 1:
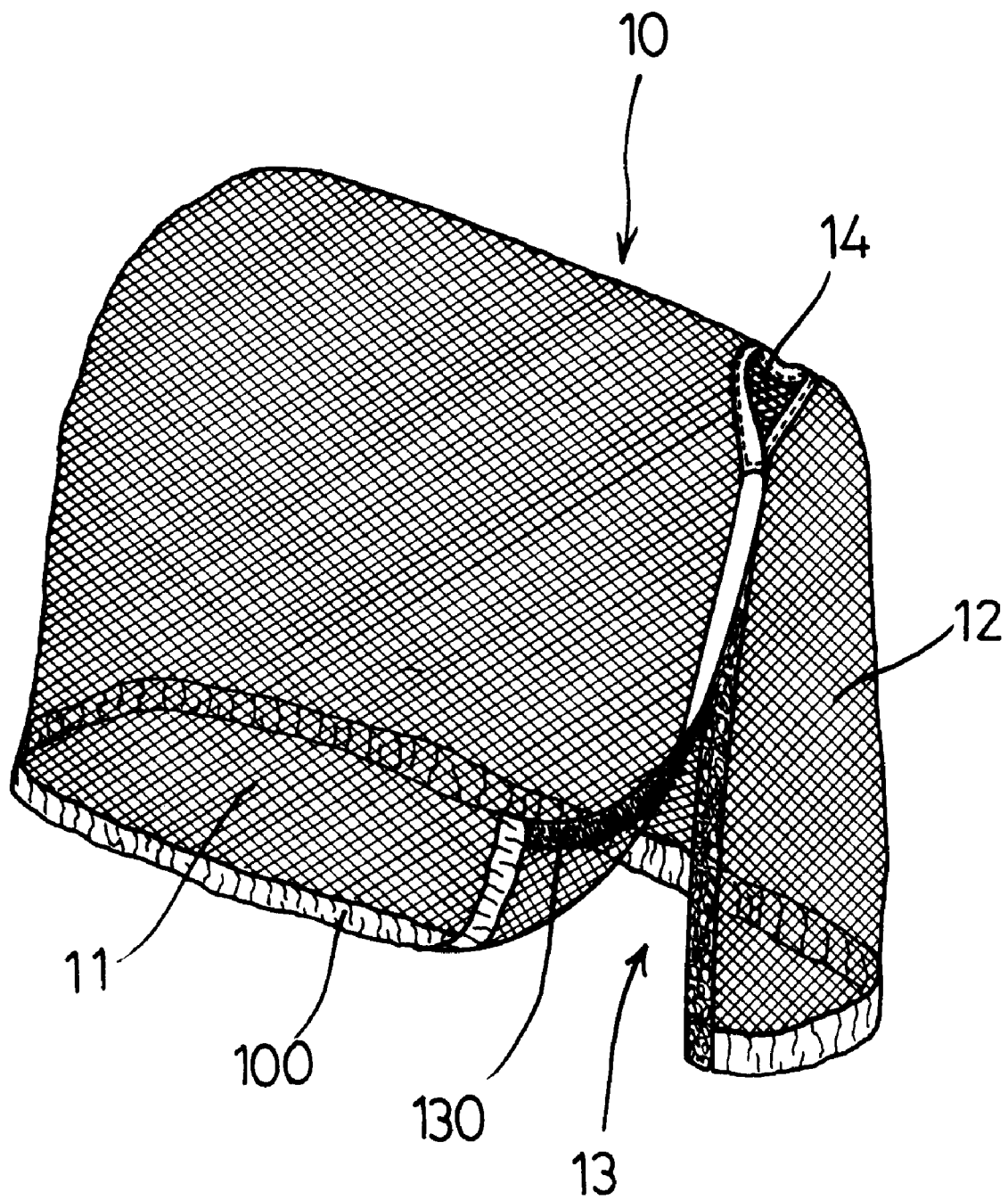
FIG. 1 is a perspective view of the vehicle window screen in accordance with the present invention.
Figure 4:
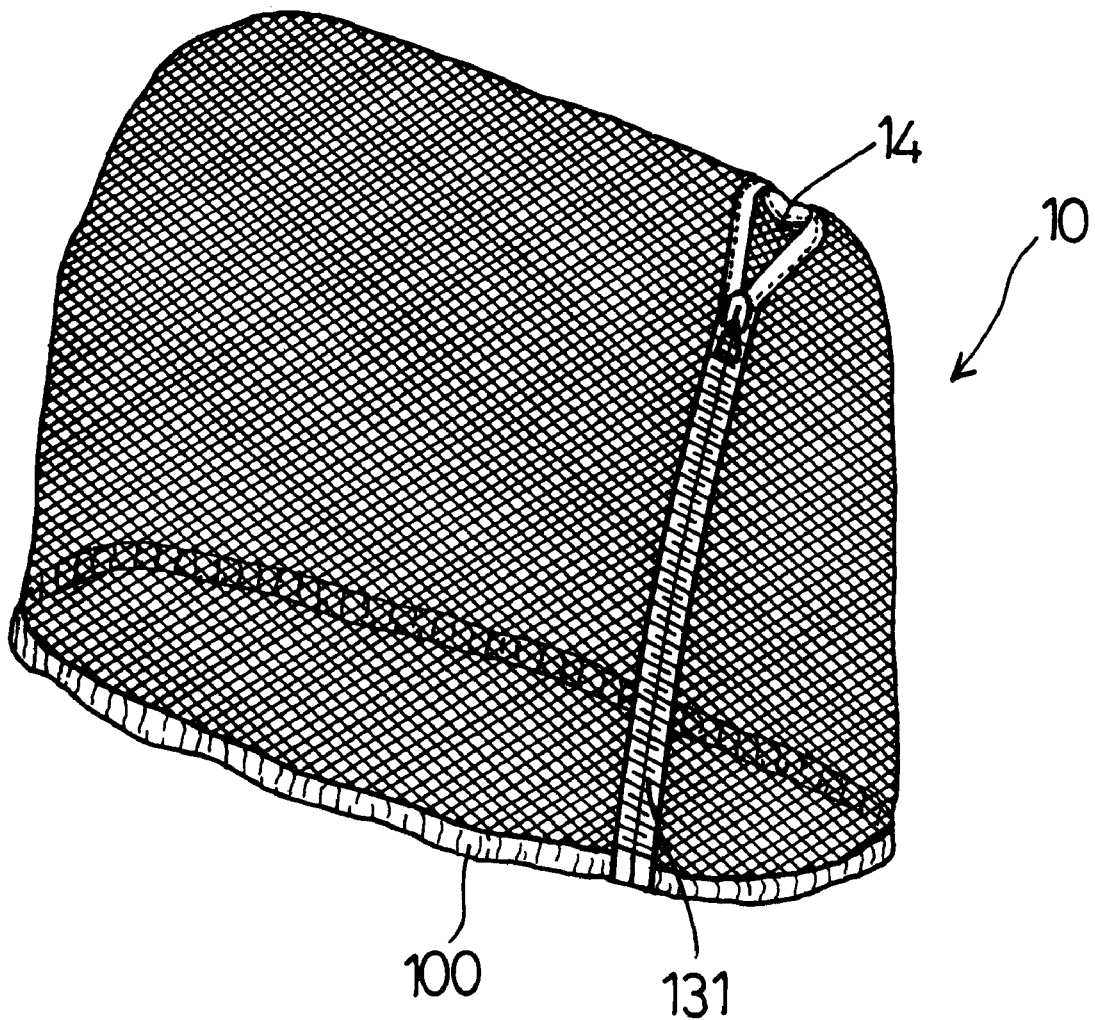
FIG. 4 is a perspective view of the window screen in accordance with the present invention.

Referring to FIGS. 1 and 4, the vehicle window screen in accordance with the present invention comprises a net hood (10) having an open lower end and a tightening means (100) (such as an elastic cord or the like) connected to the periphery defining the open lower end. The net hood (10) has an inside portion (11) and an outside portion (12) wherein, the inside portion (11) has a slit (13) defined therethrough. The slit (13) can be sealed by an attaching means such as a Velcro strip (130) as shown in FIG. 1 or a zipper (131) as shown in FIG. 4. An opening (14) is defined through the net hood (10) and communicates with the slit (13).

Figure 2:
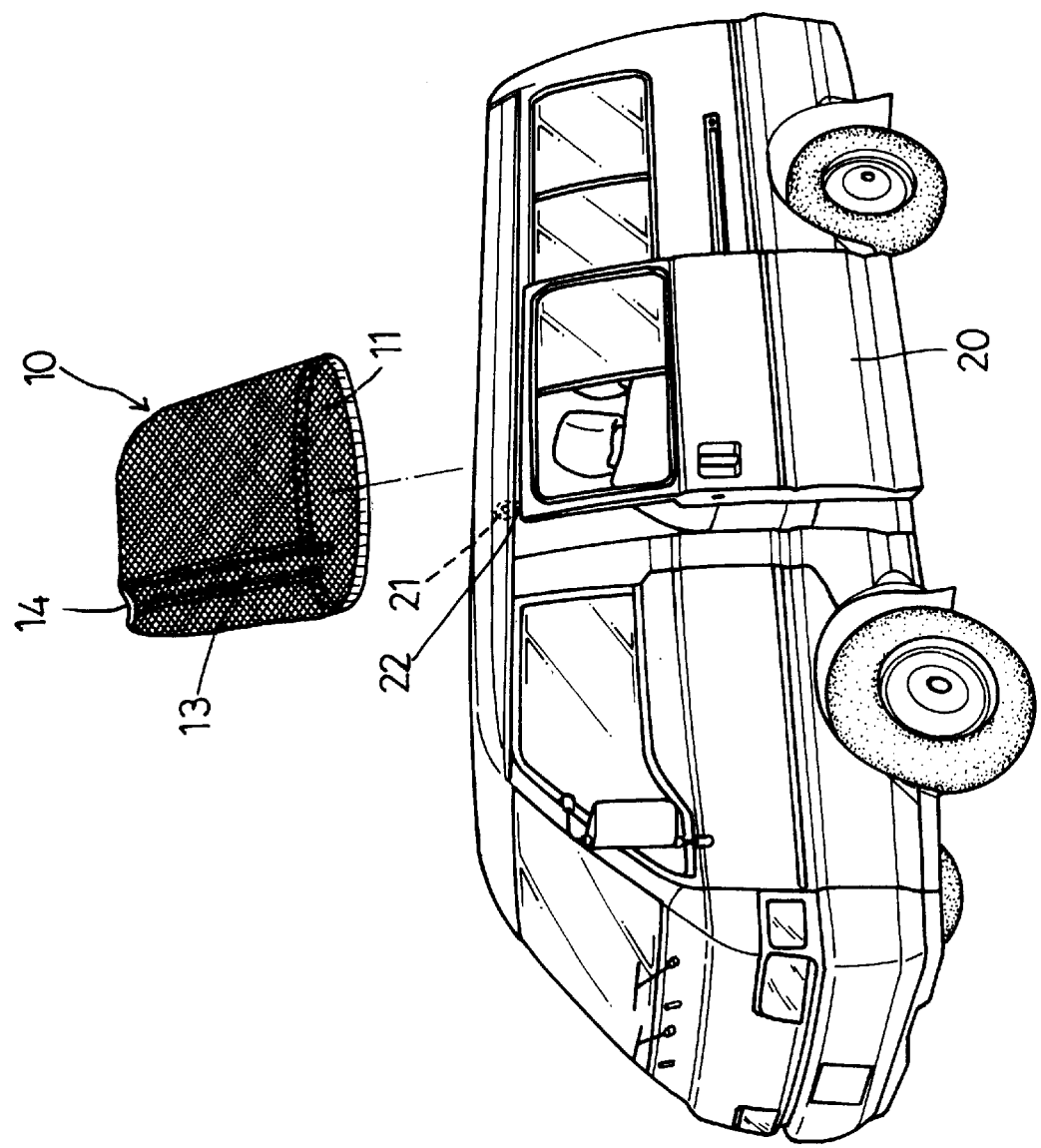
FIG. 2 is an exploded perspective view to show the window screen in accordance with the present invention and the vehicle having a sliding door.
Figure 3:
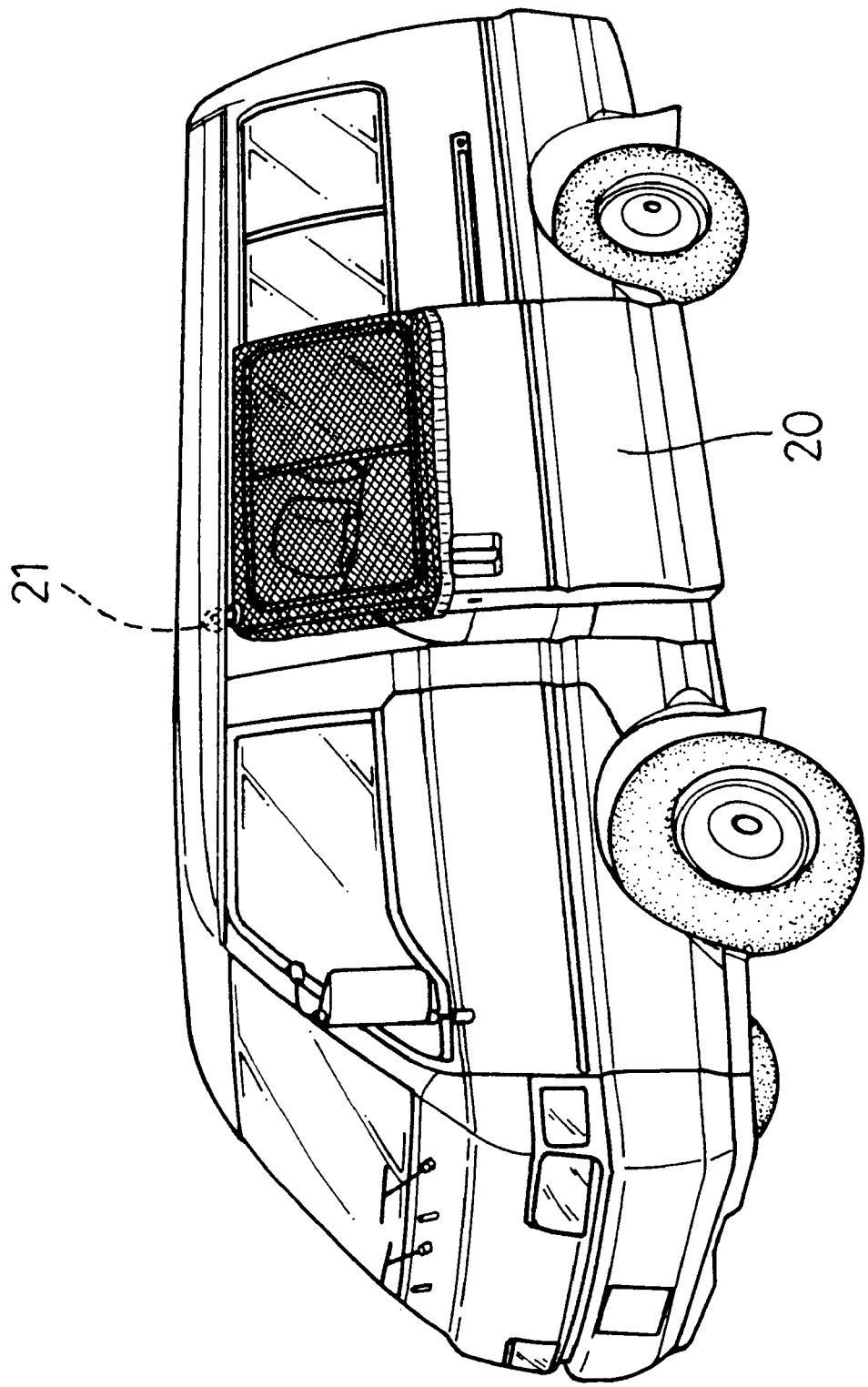
FIG. 3 is a perspective view of the vehicle window screen in accordance with the present invention mounted on the sliding door.

Referring to FIGS. 2 and 3, when the net hood (10) is mounted to the sliding door (20) of a van. The roller (21) extends through the opening (14) with the roller shank (22) extending through the slit (13). The Velcro strip (130) or the zipper (131) then closes the slit (130) so as to restrain the roller shank (22).

Accordingly, the net hood (10) is easily mounted on the window frame of the sliding door (20), and because the slit (13) is inside the vehicle, the slit (13) of the net hood (10) will not be opened by the wind.

Although the invention has been explained in relation to its preferred embodiment, it is to be understood that many other possible modifications and variations can be made without departing from the spirit and scope of the invention as hereinafter claimed.

What is claimed is:

1. The vehicle window screen comprising:

a net hood (10) having a top panel and a perimeter wall extending downwardly therefrom and further defining an open lower end and a tightening means (100) connected to a periphery defining the open lower end, said perimeter wall having an inside portion (11) and an outside portion (12) said inside portion (11) having a slit (13) defined therethrough, an opening (14) defined through said net hood (10) and communicating with said slit (13); and wherein said slit (31) is sealed by an attaching means (130).

2. The screen as claimed in claim 1, wherein said attaching means (130) is a zipper.

* * * * *